United States Patent [19]

Yamakawa et al.

[11] Patent Number: 4,830,478
[45] Date of Patent: May 16, 1989

[54] VIDEO PROJECTOR LENS SYSTEM

[75] Inventors: Kazuo Yamakawa; Kazuhito Aoki, both of Osaka, Japan

[73] Assignee: Minolta Camera Kabushiki Kaisha, Osaka, Japan

[21] Appl. No.: 222,153

[22] Filed: Jul. 21, 1988

[30] Foreign Application Priority Data

Jul. 24, 1987 [JP] Japan .................. 62-185863

[51] Int. Cl.$^4$ .................. G02B 9/60; G02B 13/18
[52] U.S. Cl. .................. 350/432; 350/412; 350/465
[58] Field of Search .................. 350/432, 412, 465

[56] References Cited

U.S. PATENT DOCUMENTS 3,800,085  3/1974  Ambats et al. .
4,530,575  7/1985  Yamakawa .................. 350/432

Primary Examiner—John K. Corbin
Assistant Examiner—Rebecca D. Gass
Attorney, Agent, or Firm—Price, Gess & Ubell

[57] ABSTRACT

The present invention provides a lens system for projecting to a screen a video image formed on a face plate of a cathode ray tube. The lens system comprises, from the screen side to the tube side: a first positive lens unit; a second positive lens unit; a third negative lens unit having a screen side surface convex to the screen side; a fourth lens unit of bi-convex lens; and a fifth negative lens unit having a screen side surface concave to the screen side, at least the fourth lens unit being made of glass material, wherein the lens system includes at least one aspheric surface and fulfills the following conditions:

$$2 < f_1/f < 5$$

$$1 < f_2/f_3 < 3$$

$$\nu_3 < 40$$

wherein; f represents the focal length of the whole lens system; $f_1$ represents the focal length of the first positive lens unit; $f_2$ represents the focal length of the second positive lens unit; $f_3$ represents the focal length of the third negative lens unit; and $\nu_3$ represents the Abbe number of the third negative lens unit.

9 Claims, 11 Drawing Sheets

Spherical Aberration  Astigmatism

F=1.05

—— d
—·— F

-1.0　1.0

Spherical Aberration

ω=26°

DS —— d
——— F

DT ·—·— d
——— F

-1.0　1.0

Astigmatism

Spherical Aberration

Astigmatism

Spherical Aberration

Astigmatism

Spherical Aberration

Astigmatism

F=1.05

—— d
—·— F

-1.0  1.0
Spherical Aberration

ω=26°

DS ——— d
    —·— F
DT ——— d
    ---- F

-1.0  1.0
Astigmatism

Spherical Aberration

Astigmatism

FIG.15
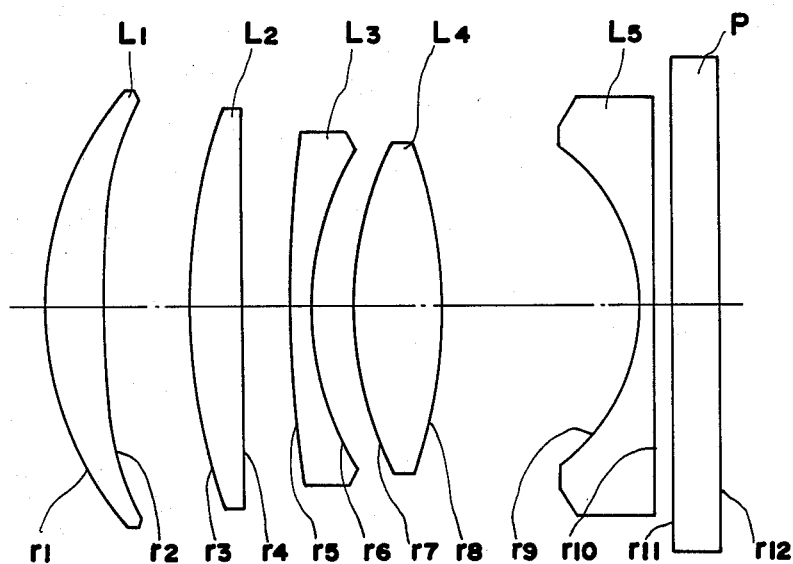
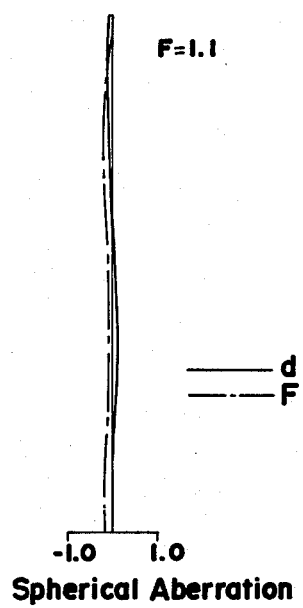
FIG.16a
Spherical Aberration
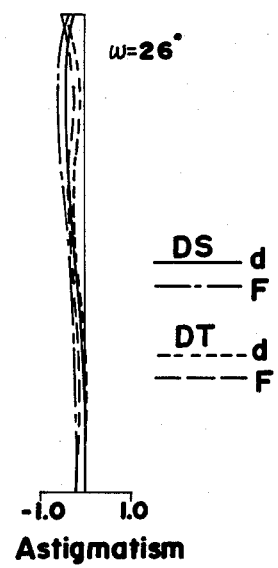
FIG.16b
Astigmatism FIG.17
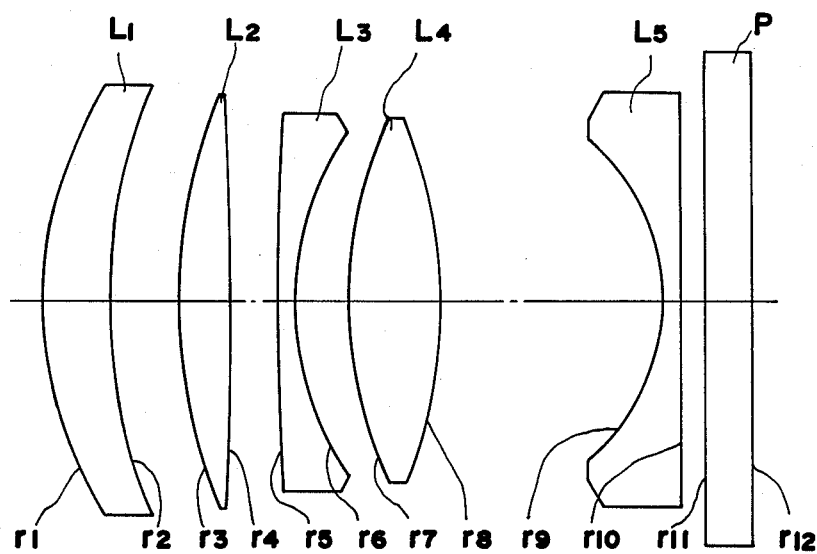
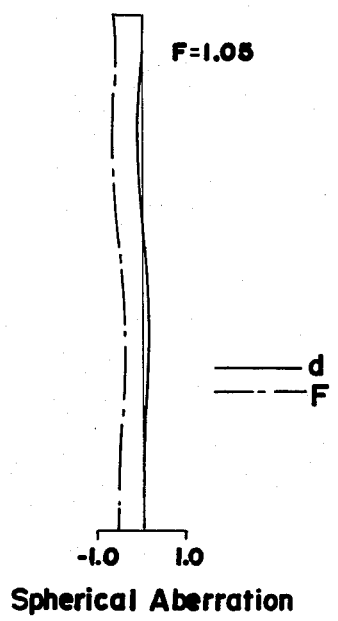
FIG.18a
Spherical Aberration
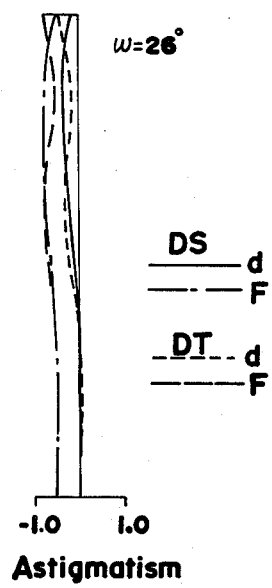
FIG.18b
Astigmatism Spherical Aberration Astigmatism Spherical Aberration Astigmatism

VIDEO PROJECTOR LENS SYSTEM

BACKGROUND OF THE INVENTION

1. Field of the Invention

The present invention relates to a lens system for a video projector, and more particularly to a refractive lens system located in front of the cathode ray tube for projecting onto a screen a video image formed on a fluorescent face of the cathode ray tube.

2. Description of the Prior Art

In a color video projector of a three-tube type emitting red, green and blue light, respectively, the correction of chromatic aberration can be generally left out of consideration, since three identical projecting lens systems are located in front of each of the cathode ray tubes for forming three different monochromatic images so as to project them toward a screen for composing one complete color image thereon, each of the projecting lens systems is required to transmit only one monochromatic image. Strictly speaking, however, the monochromatic image is practically formed by the light of a plurality of different wavelengths within a narrow wavelength band in accordance with the spectral characteristic of the fluorescent material of individual cathode ray tubes. Especially, the images formed by the cathode ray tubes in charge of a green image and a blue image, respectively, are inadequate to be regarded as monochromatic images. Therefore, because of the above mentioned wavelength bands forming the "monochromatic image", the chromatic aberration of the video projector lens system cannot be neglected in a high definition video projector such as CRT for displaying characters utilized as a terminal of a computer.

The video projector lens system generally utilizes plastic lens elements to form aspheric surfaces thereon. But in the above mentioned high definition or middle definition video projector, a temperature dependent characteristic thereof also creates a significant problem. That is, a plastic lens element generally shows a greater degree of variation in refractive index depending on the change in temperature, in comparison with a glass lens element.

SUMMARY OF THE INVENTION

An object of the present invention is to solve the above mentioned problems and provide an improved lens system for a high or a middle definition video projector.

Another object of the present invention is to provide a video projector lens system with high performance capable of optically transmitting a high definition video image and with an F-number smaller than F2.

According to the present invention, the lens system comprises, from the screen side to the tube side, a first positive lens unit, a second positive lens unit, a third negative lens unit having a screen side surface convex to the screen side, a fourth lens unit of a bi-convex lens and a fifth negative lens unit having a screen side surface concave to the screen side; at least the fourth lens unit being made of glass material, wherein the lens system includes at least one aspheric surface and fulfills the following conditions:

$$2 < f_1/f < 5$$

$$1 < f_2/|f_3| < 3$$

$$\nu_3 < 40$$

wherein f represents the focal length of the whole lens system; $f_1$ represents the focal length of the first positive lens unit; $f_2$ represents the focal length of the second positive lens unit; $f_3$ represents the focal length of the third negative lens unit; and $\nu_3$ represents the Abbe number of the third negative lens unit.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 15 represents a schematic cross sectional view of the lens system according to an eighth embodiment of the present invention;

FIGS. 16a and 16b represent graphic plots of aberration curves of the eighth embodiment of the present invention;

FIG. 17 represents a schematic cross sectional view of the lens system according to a ninth embodiment of the present invention;

FIGS. 18a and 18b represent graphic plots of aberration curves of the ninth embodiment of the present invention;

DETAILED DESCRIPTION OF THE PREFERRED EMBODIMENTS

Figure 1:
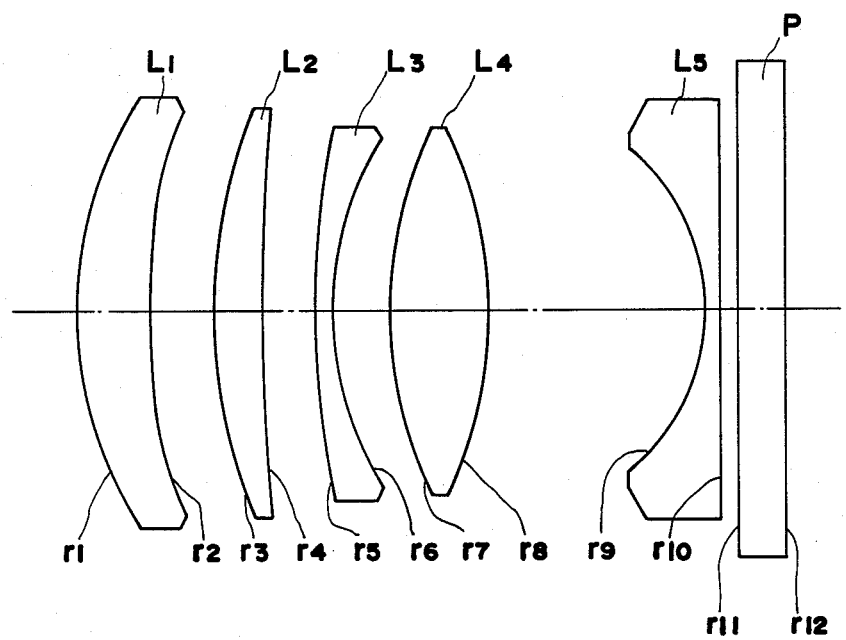
FIG. 1 represents a schematic cross sectional view of the lens system according to a first embodiment of the present invention.

The following description is provided to enable any person skilled in the commercial optical video field to make and use the invention and sets forth the best modes contemplated by the inventors for carrying out their invention. Various modifications, however, will remain readily apparent to those skilled in the art, since the generic principles of the present invention have been defined herein specifically to provide a relatively economical and easily manufactured video projector lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a video projector.

In the drawings, schematic cross sectional views disclose the position of the lens elements. Due to the number of lens elements involved, it was not deemed appropriate to include individual designation of the radii of curvature and axial distance for each lens element and air space. These values, however, are provided in the accompanying tables set forth herein, and the schematic cross sectional views of the respective embodiments follow the normal conventions of the screen side at the left-hand side of the drawing and the tube side at the right-hand side.

Figure 3:
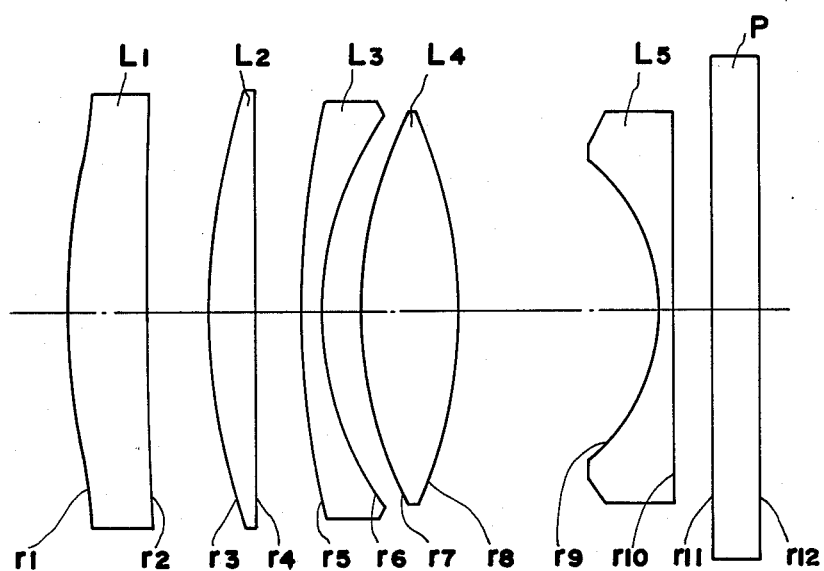
FIG. 3 represents a schematic cross sectional view of the lens system according to a second embodiment of the present invention.
Figure 5:
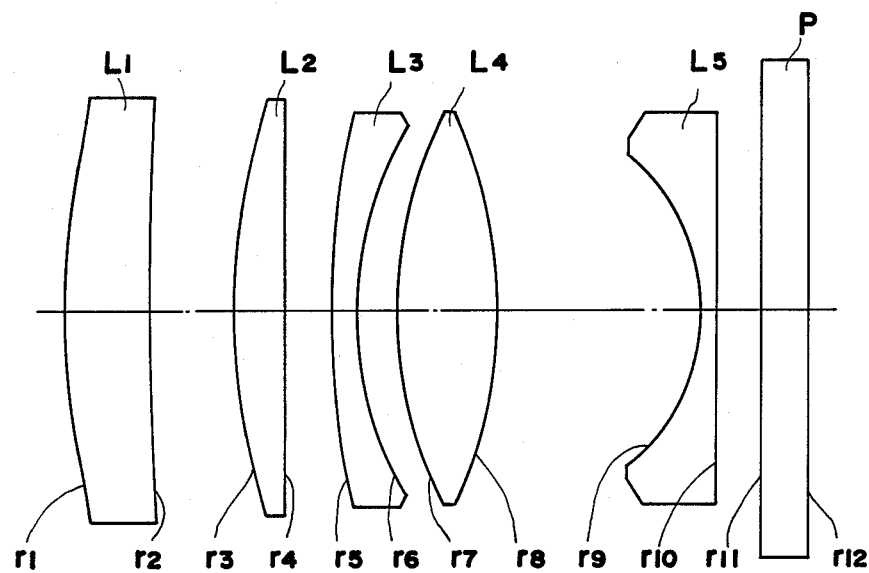
FIG. 5 represents a schematic cross sectional view of the lens system according to a third embodiment of the present invention.
Figure 7:
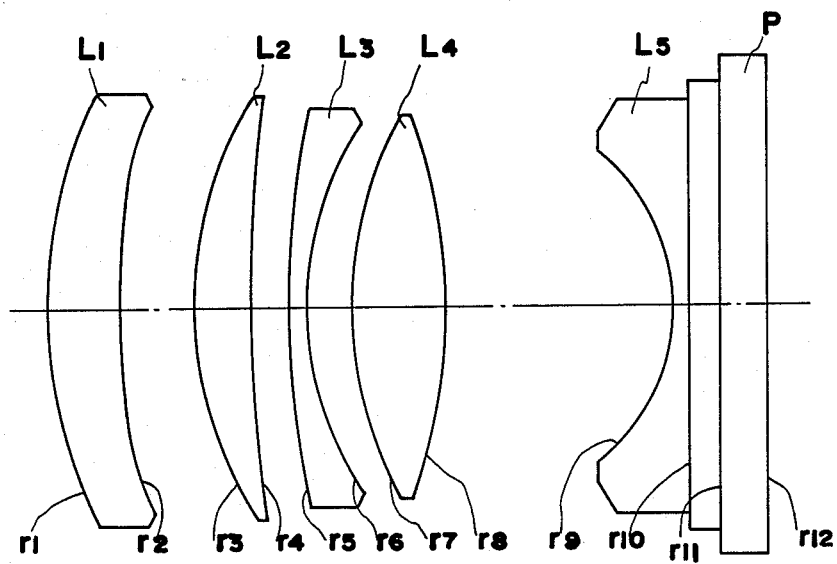
FIG. 7 represents a schematic cross sectional view of the lens system according to a fourth embodiment of the present invention.
Figure 9:
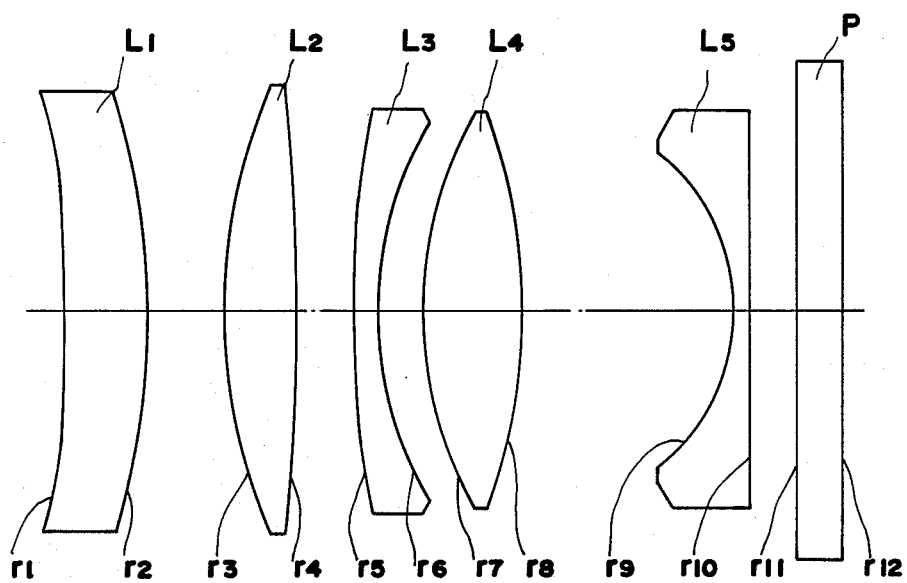
FIG. 9 represents a schematic cross sectional view of the lens system according to a fifth embodiment of the present invention.
Figure 11:
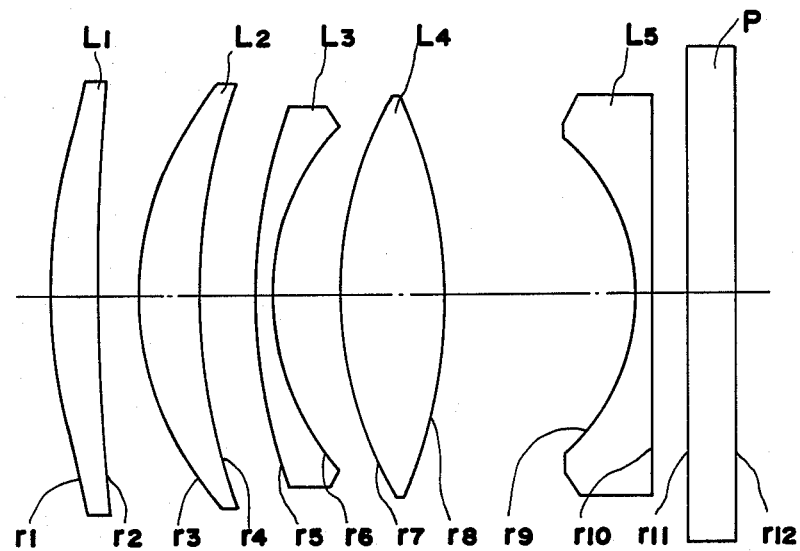
FIG. 11 represents a schematic cross sectional view of the lens system according to a sixth embodiment of the present invention.
Figure 13:
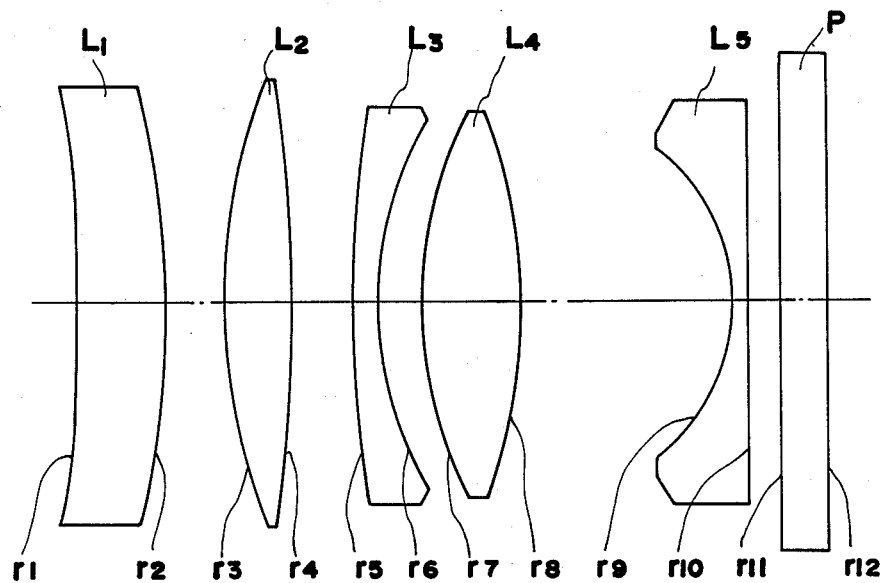
FIG. 13 represents a schematic cross sectional view of the lens system according to a seventh embodiment of the present invention.
Figure 19:
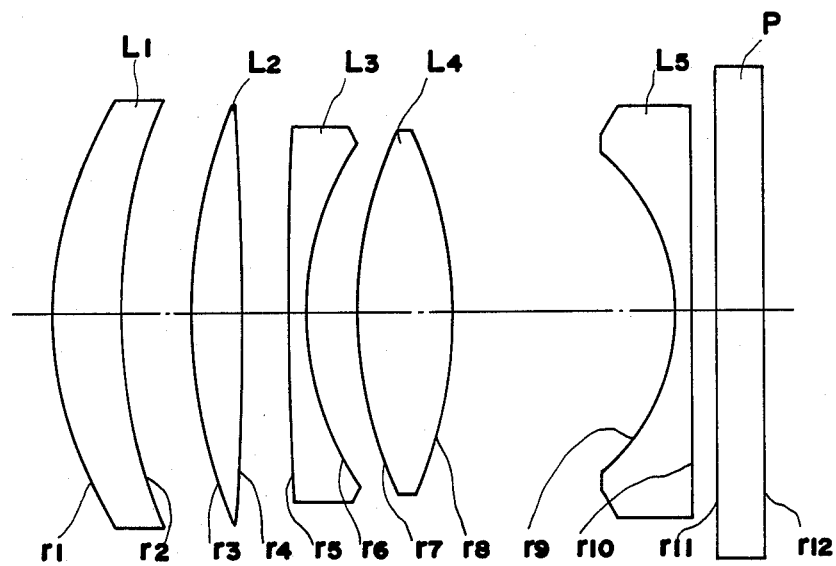
FIG. 19 represents a schematic cross sectional view of the lens system according to a tenth embodiment of the present invention.
Figure 21:
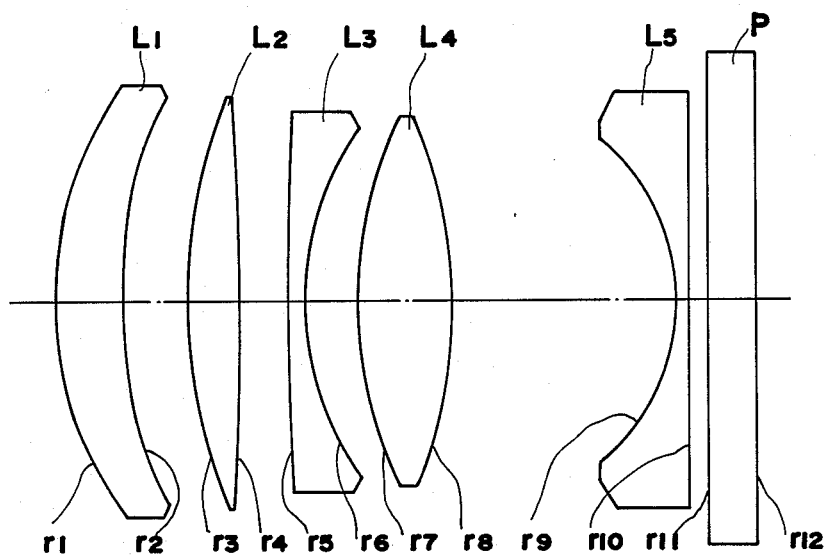
FIG. 21 represents a schematic cross sectional view of the lens system according to an eleventh embodiment of the present invention.

As disclosed in FIGS. 1,3,5,7,9,11,13,15,17,19 and 21, the present invention provides a lens system comprising from the screen side to the tube side: a first positive lens unit ($L_1$); a second positive lens unit ($L_2$); a third negative lens unit ($L_3$) having a screen side surface convex to the screen side; a fourth lens unit of bi-convex lens ($L_4$); and a fifth negative lens unit ($L_5$) having a screen side surface concave to the screen side, at least the fourth lens unit ($L_4$) is made of glass material, wherein the lens system includes at least one aspheric surface and fulfills the following conditions:

$$2 < f_1/f < 5 \quad (1)$$

$$1 < f_2/|f_3| < 3 \quad (2)$$

$$\nu_3 < 40 \quad (3)$$

wherein; f represents the focal length of the whole lens system; $f_1$ represents the focal length of the first positive lens unit ($L_1$); $f_2$ represents the focal length of the second positive lens unit ($L_2$); $f_3$ represents the focal length of the third negative lens unit ($L_3$); and $\nu_3$ represents the Abbe number of the third negative lens unit ($L_3$) with respect to d-line.

According to the present invention, a high performance for correcting aberrations is secured by the adoption of at least one aspheric surface with the utilization of at least one plastic lens element.

Further, the present invention is characterized by the method of reducing the temperature, dependent variation of the optical performance of the lens system. In other words, at least the fourth lens unit ($L_4$), which bears a considerable part of the whole positive refractive power distributed in the lens system, is formed of glass material so as not to be affected by a change of temperature. The glass lens unit ($L_4$) is also effective for shielding the X-ray radiation caused by the fluorescent surface of the cathode ray tube.

The above condition (1) defines the refractive power of the first lens unit ($L_1$) so as to balance the corrections for the paraxial aberrations and the off-axial aberrations. If the lower limit of condition (1) is violated, it results in the generation of spherical aberration of higher degree and negative deviation of the field curvature. On the other hand, the over-correction of the field curvature and the sagittal flare in the off-axial region would be caused if the upper limit of condition (1) is violated. In any case of a violation of the limits of condition (1), the corrections for the paraxial and the off-axial aberrations would be unbalanced and the lens system would fail to attain the desired high optical performance and the high speed.

Condition (2) is for correcting chromatic aberration and other aberrations while keeping a good balance therebetween. Violating the lower limit of condition (2) results in a generation of spherical aberration of higher degree and a negative deviation of the field curvature. On the other hand, it would be difficult to sufficiently correct the longitudinal chromatic aberration if the upper limit of condition (2) is violated.

Condition (3), as well as condition (2), is for correcting chromatic aberration, and without fulfilling this condition (3), it would be difficult to reduce sufficiently the longitudinal chromatic aberration within a tolerable range.

In accordance with the present invention, the lens system is further recommended to fulfill the following conditions:

$$(4) \ n_4 > 1.55$$

$$(5) \ 0.6 < f_4/f < 0.9$$

wherein: $n_4$ represents the refractive index of the fourth lens unit ($L_4$) with respect to d-line; and $f_4$ represents the focal length of the fourth lens unit ($L_4$).

Condition (4) defines the refractive index of the fourth lens unit ($L_4$) without fulfilling this condition (4), it would be difficult to obtain any practical glass material effective to sufficiently shield X-ray radiation it would also be difficult to sufficiently correct spherical aberration or other aberrations with a spherical glass lens element, since the radius of curvature of the refractive surface becomes short in order to permit the refractive power to be distributed to the fourth lens unit ($L_4$).

Condition (5), as well as condition (1), is for obtaining a lens system with high optical performance and a high speed, and defines the positive refractive power of the fourth lens unit ($L_4$). If the lower limit of condition (5) is violated, the positive refractive power applied to the fourth lens unit ($L_4$) becomes relatively excessive to correct the spherical aberration of higher degree and the negative deviation of the field curvature. On the other hand, if the upper limit of condition (5) is violated, the positive refractive power applied to the fourth lens unit ($L_4$) becomes relatively insufficient to control the over-correction of the field curvature and the generation of the off-axial region within a predetermined permissible range.

Furthermore, the present invention is recommended to fulfill the following conditions:

(6) $0.1f < D_{12} + D_{23} < 0.4f$ (7) $0.35f < D_{45} < 0.5f$ wherein; $D_{12}$ represents the air space between the first lens unit ($L_1$) and the second lens unit ($L_2$); $D_{23}$ represents the air space between the second lens unit ($L_2$) and the third lens unit ($L_3$); and $D_{45}$ represents the air space between the fourth lens unit ($L_4$) and the fifth lens unit ($L_5$).

Condition (6) is provided for correcting the paraxial and the off-axial aberrations and, keeping a good balance therebetween. Violating the lower limit of condition (6) results in a generation of spherical aberration of higher degree and a negative deviation of the field curvature.

Meanwhile, the field curvature is in an over-correcting condition, and undesirable sagittal flare in the off-axial region is caused if the upper limit of condition (6) is violated. In any case of violating the above condition (6), the corrections for the paraxial and the off-axial aberrations would not be sufficiently balanced and the lens system would fail to attain the desired high optical performance and the desired high speed.

Condition (7) defines the relative arrangement of the fourth lens unit ($L_4$). If the lower limit of condition (7) is violated, the increase of the astigmatic difference and a negative deviation of the field curvature cannot be corrected easily. On the other hand, spherical aberration and the sagittal flare in the off-axial region cannot be corrected easily if the upper limit of condition (7) is violated.

The following tables 1 to 11 disclose, respectively, the first through eleventh embodiments according to the present invention.

In the tables 1 to 11, radii of curvature, $r_1$, $r_2$...; axial distances $d_1$, $d_2$...; refractive indices for d-line (with a wavelength, 587.6 nm), $n_1$, $n_2$...; and Abbe number of d-line, $\nu_1$, $\nu_2$... are numbered from the screen side to the tube side. Further, the radius of curvature with asterisk(*) means that the corresponding surface is an aspheric surface defined by the following formula:

$$X = \frac{C_0 Y^2}{1 + (1 - C_0^2 Y^2)^{\frac{1}{2}}} + \sum_{i=2}^{8} C_i Y^i$$

wherein; X represents the coordinate along the optical axis measured from the top of the basic spherical surface toward the tube side; Y represents the coordinate perpendicular to the optical axis measured from the optical axis (height from the optical axis); $C_o$ represents the curvature of the basic spherical surface of radius of curvature r ( $C_o = 1/r$ ) of the aspheric surface; and $C_i$ represents the aspheric surface coefficient. The lower part of Tables 1 to 11 summarizes the values for aspheric surface coefficients with respect to aspheric surfaces in each Example. (Radius of curvature of the aspheric surface in the paraxial region is equal to $C_o + 2C$).

TABLE 1

Embodiment 1

$f = 100 \quad \beta = -0.0514 \quad F_{NO} = 1.05 \quad 2\omega = 52°$

| | | Radius of Curvature | Axial Distance | Refractive Index(ND) | Abbe Number ($\nu d$) |
|---|---|---|---|---|---|
| $L_1$ | $r_1$* | 88.76 | | | |
| | | | $d_1$ 15.69 | $n_1$ 1.491 | $\nu_1$ 57.8 |
| | $r_2$* | 223.44 | | | |
| | | | $d_2$ 13.55 | | |
| $L_2$ | $r_3$ | 107.52 | | | |
| | | | $d_3$ 11.01 | $n_2$ 1.620 | $\nu_2$ 60.3 |
| | $r_4$ | 626.90 | | | |
| | | | $d_4$ 11.70 | | |
| $L_3$ | $r_5$ | 219.23 | | | |
| | | | $d_5$ 3.44 | $n_3$ 1.805 | $\nu_3$ 25.4 |
| | $r_6$ | 68.65 | | | |
| | | | $d_6$ 12.52 | | |
| $L_4$ | $r_7$ | 86.17 | | | |
| | | | $d_7$ 21.33 | $n_4$ 1.620 | $\nu_4$ 60.3 |
| | $r_8$ | −96.55 | | | |
| | | | $d_8$ 48.09 | | |
| $L_5$ | $r_9$* | −40.16 | | | |
| | | | $d_9$ 3.44 | $n_5$ 1.491 | $\nu_5$ 57.8 |
| | $r_{10}$ | ∞ | | | |
| | | | $d_{10}$ 4.01 | | |
| | $r_{11}$ | ∞ | | | |
| P | | | $d_{11}$ 10.32 | $n_6$ 1.536 | $\nu_6$ 50.7 |
| | $r_{12}$ | ∞ | | | |

Aspheric surface coefficients

| | $r_1$ | $r_2$ | $r_9$ |
|---|---|---|---|
| $c_2$ | $-0.16899 \times 10^{-7}$ | $0.61854 \times 10^{-6}$ | $-0.25539 \times 10^{-6}$ |
| $c_3$ | $0.90660 \times 10^{-10}$ | $0.10128 \times 10^{-9}$ | $0.33711 \times 10^{-8}$ |
| $c_4$ | $-0.11696 \times 10^{-13}$ | $0.44314 \times 10^{-13}$ | $-0.24615 \times 10^{-11}$ |
| $c_5$ | 0 | 0 | $0.82466 \times 10^{-15}$ |
| $c_6$ | 0 | 0 | $0.90309 \times 10^{-19}$ |
| $c_7$ | 0 | 0 | $0.30165 \times 10^{-22}$ |
| $c_8$ | 0 | 0 | $0.43219 \times 10^{-26}$ |

TABLE 2

Embodiment 2

$f = 100 \quad \beta = -0.0514 \quad F_{NO} = 1.05 \quad 2\omega = 52°$

| | | Radius of Curvature | Axial Distance | Refractive Index(ND) | Abbe Number ($\nu d$) |
|---|---|---|---|---|---|
| $L_1$ | $r_1$* | 111.76 | | | |
| | | | $d_1$ 18.07 | $n_1$ 1.491 | $\nu_1$ 57.8 |
| | $r_2$ | 1403.64 | | | |
| | | | $d_2$ 13.37 | | |
| $L_2$ | $r_3$* | 151.86 | | | |
| | | | $d_3$ 10.31 | $n_2$ 1.491 | $\nu_2$ 57.8 |
| | $r_4$ | | | | |
| | | | $d_4$ 10.12 | | |
| $L_3$ | $r_5$ | 193.09 | | | |
| | | | $d_5$ 4.60 | $n_3$ 1.805 | $\nu_3$ 25.4 |
| | $r_6$ | 73.66 | | | |
| | | | $d_6$ 7.67 | | |
| $L_4$ | $r_7$ | 83.74 | | | |
| | | | $d_7$ 22.69 | $n_4$ 1.620 | $\nu_4$ 60.3 |
| | $r_8$ | −94.33 | | | |
| | | | $d_8$ 43.36 | | |
| $L_5$ | $r_9$* | −39.85 | | | |
| | | | $d_9$ 3.48 | $n_5$ 1.491 | $\nu_5$ 57.8 |
| | $r_{10}$ | ∞ | | | |
| | | | $d_{10}$ 8.80 | | |
| | $r_{11}$ | ∞ | | | |
| P | | | $d_{11}$ 10.31 | $n_6$ 1.536 | $\nu_6$ 50.7 |
| | $r_{12}$ | ∞ | | | |

Aspheric surface coefficients

| | $r_1$ | $r_3$ | $r_9$ |
|---|---|---|---|
| $c_2$ | $-0.74684 \times 10^{-6}$ | $0.32623 \times 10^{-6}$ | $-0.72608 \times 10^{-6}$ |

TABLE 2-continued

Embodiment 2

| | | | |
|---|---|---|---|
| $c_3$ | $-0.67704 \times 10^{-10}$ | $0.13869 \times 10^{-10}$ | $0.33164 \times 10^{-8}$ |
| $c_4$ | $-0.15611 \times 10^{-13}$ | $-0.43753 \times 10^{-13}$ | $-0.24835 \times 10^{-11}$ |
| $c_5$ | 0 | 0 | $0.86127 \times 10^{-15}$ |
| $c_6$ | 0 | 0 | $0.88523 \times 10^{-19}$ |
| $c_7$ | 0 | 0 | $0.30302 \times 10^{-22}$ |
| $c_8$ | 0 | 0 | $0.43724 \times 10^{-26}$ |

TABLE 3

Embodiment 3

$f = 100$ $\beta = -0.0735$ $F_{NO} = 1.10$ $2\omega = 52°$

| | | Radius of Curvature | | Axial Distance | | Refractive Index(ND) | | Abbe Number ($\nu d$) |
|---|---|---|---|---|---|---|---|---|
| $L_1$ | $r_1^*$ | 128.81 | $d_1$ | 18.64 | $n_1$ | 1.491 | $\nu_1$ | 57.8 |
| | $r_2$ | 761.21 | $d_2$ | 18.51 | | | | |
| $L_2$ | $r_3^*$ | 122.89 | $d_3$ | 11.14 | $n_2$ | 1.491 | $\nu_2$ | 57.8 |
| | $r_4$ | 4987.40 | $d_4$ | 10.48 | | | | |
| $L_3$ | $r_5$ | 188.82 | $d_5$ | 5.21 | $n_3$ | 1.805 | $\nu_3$ | 25.4 |
| | $r_6$ | 75.89 | $d_6$ | 9.07 | | | | |
| $L_4$ | $r_7$ | 86.19 | $d_7$ | 23.17 | $n_4$ | 1.620 | $\nu_4$ | 60.3 |
| | $r_8$ | $-93.34$ | $d_8$ | 44.16 | | | | |
| $L_5$ | $r_9^*$ | $-39.63$ | $d_9$ | 3.49 | $n_5$ | 1.491 | $\nu_5$ | 57.8 |
| | $r_{10}$ | $\infty$ | $d_{10}$ | 9.82 | | | | |
| P | $r_{11}$ | $\infty$ | $d_{11}$ | 10.33 | $n_6$ | 1.536 | $\nu_6$ | 50.7 |
| | $r_{12}$ | $\infty$ | | | | | | |

Aspheric surface coefficients

| | $r_1$ | $r_3$ | $r_9$ |
|---|---|---|---|
| $c_2$ | $-0.50693 \times 10^{-6}$ | $-0.18692 \times 10^{-8}$ | $-0.64958 \times 10^{-6}$ |
| $c_3$ | $-0.37053 \times 10^{-10}$ | $-0.92103 \times 10^{-11}$ | $0.35222 \times 10^{-8}$ |
| $c_4$ | $-0.84144 \times 10^{-14}$ | $-0.51426 \times 10^{-13}$ | $-0.23509 \times 10^{-11}$ |
| $c_5$ | 0 | 0 | $0.85944 \times 10^{-15}$ |
| $c_6$ | 0 | 0 | $0.87872 \times 10^{-19}$ |
| $c_7$ | 0 | 0 | $0.29566 \times 10^{-22}$ |
| $c_8$ | 0 | 0 | $0.42391 \times 10^{-26}$ |

TABLE 4

Embodiment 4

$f = 100$ $\beta = -0.0514$ $F_{NO} = 1.05$ $2\omega = 52°$

| | | Radius of Curvature | | Axial Distance | | Refractive Index(ND) | | Abbe Number ($\nu d$) |
|---|---|---|---|---|---|---|---|---|
| $L_1$ | $r_1^*$ | 108.49 | $d_1$ | 15.71 | $n_1$ | 1.491 | $\nu_1$ | 57.8 |
| | $r_2^*$ | 243.30 | $d_2$ | 16.15 | | | | |
| $L_2$ | $r_3$ | 80.26 | $d_3$ | 12.40 | $n_2$ | 1.620 | $\nu_2$ | 60.3 |
| | $r_4$ | 288.70 | $d_4$ | 8.60 | | | | |
| $L_3$ | $r_5$ | 219.49 | $d_5$ | 3.44 | $n_3$ | 1.805 | $\nu_3$ | 25.4 |
| | $r_6$ | 68.73 | $d_6$ | 10.00 | | | | |
| $L_4$ | $r_7$ | 83.89 | $d_7$ | 21.36 | $n_4$ | 1.620 | $\nu_4$ | 60.3 |
| | $r_8$ | $-104.29$ | $d_8$ | 49.32 | | | | |
| $L_5$ | $r_9^*$ | $-40.82$ | $d_9$ | 3.44 | $n_5$ | 1.491 | $\nu_5$ | 57.8 |

TABLE 4-continued

Embodiment 4

| | | | | | | | | |
|---|---|---|---|---|---|---|---|---|
| | $r_{10}$ | $\infty$ | $d_{10}$ | 6.64 | $n_6$ | 1.410 | $\nu_6$ | 51.5 |
| P | $r_{11}$ | $\infty$ | $d_{11}$ | 10.33 | $n_7$ | 1.536 | $\nu_7$ | 50.7 |
| | $r_{12}$ | $\infty$ | | | | | | |

Aspheric surface coefficients

| | $r_1$ | $r_2$ | $r_9$ |
|---|---|---|---|
| $c_2$ | $-0.71709 \times 10^{-7}$ | $0.40397 \times 10^{-6}$ | $-0.14829 \times 10^{-5}$ |
| $c_3$ | $-0.79147 \times 10^{-11}$ | $0.14996 \times 10^{-9}$ | $0.31587 \times 10^{-8}$ |
| $c_4$ | $0.10125 \times 10^{-12}$ | $0.81032 \times 10^{-13}$ | $-0.19930 \times 10^{-11}$ |
| $c_5$ | $-0.21442 \times 10^{-16}$ | 0 | $0.63341 \times 10^{-15}$ |
| $c_6$ | 0 | 0 | $0.61376 \times 10^{-19}$ |
| $c_7$ | 0 | 0 | $0.27615 \times 10^{-22}$ |
| $c_8$ | 0 | 0 | $0.42441 \times 10^{-26}$ |

TABLE 5

Embodiment 5

$f = 100$ $\beta = -0.0735$ $F_{NO} = 1.10$ $2\omega = 52°$

| | | Radius of Curvature | | Axial Distance | | Refractive Index(ND) | | Abbe Number ($\nu d$) |
|---|---|---|---|---|---|---|---|---|
| $L_1$ | $r_1^*$ | $-870.40$ | $d_1$ | 17.99 | $n_1$ | 1.491 | $\nu_1$ | 57.8 |
| | $r_2$ | $-166.50$ | $d_2$ | 16.80 | | | | |
| $L_2$ | $r_3^*$ | 120.93 | $d_3$ | 15.76 | $n_2$ | 1.491 | $\nu_2$ | 57.8 |
| | $r_4$ | $-404.75$ | $d_4$ | 12.18 | | | | |
| $L_3$ | $r_5$ | 223.12 | $d_5$ | 5.15 | $n_3$ | 1.805 | $\nu_3$ | 25.4 |
| | $r_6$ | 75.57 | $d_6$ | 10.03 | | | | |
| $L_4$ | $r_7$ | 79.17 | $d_7$ | 23.16 | $n_4$ | 1.620 | $\nu_4$ | 60.3 |
| | $r_8$ | $-115.68$ | $d_8$ | 46.20 | | | | |
| $L_5$ | $r_9^*$ | $-39.41$ | $d_9$ | 3.48 | $n_5$ | 1.491 | $\nu_5$ | 57.8 |
| | $r_{10}$ | $\infty$ | $d_{10}$ | 9.90 | | | | |
| P | $r_{11}$ | $\infty$ | $d_{11}$ | 10.31 | $n_6$ | 1.536 | $\nu_6$ | 50.7 |
| | $r_{12}$ | $\infty$ | | | | | | |

Aspheric surface coefficients

| | $r_1$ | $r_3$ | $r_9$ |
|---|---|---|---|
| $c_2$ | $-0.97142 \times 10^{-6}$ | $0.49157 \times 10^{-6}$ | $-0.88580 \times 10^{-6}$ |
| $c_3$ | $0.11886 \times 10^{-9}$ | $-0.17179 \times 10^{-9}$ | $0.30694 \times 10^{-8}$ |
| $c_4$ | $-0.14065 \times 10^{-13}$ | $-0.66569 \times 10^{-14}$ | $-0.22827 \times 10^{-11}$ |
| $c_5$ | 0 | 0 | $0.90239 \times 10^{-15}$ |
| $c_6$ | 0 | 0 | $0.92987 \times 10^{-19}$ |
| $c_7$ | 0 | 0 | $0.30540 \times 10^{-22}$ |
| $c_8$ | 0 | 0 | $0.43749 \times 10^{-26}$ |

TABLE 6

Embodiment 6

$f = 100$ $\beta = -0.0735$ $F_{NO} = 1.10$ $2\omega = 52°$

| | | Radius of Curvature | | Axial Distance | | Refractive Index(ND) | | Abbe Number ($\nu d$) |
|---|---|---|---|---|---|---|---|---|
| $L_1$ | $r_1^*$ | 104.81 | $d_1$ | 10.76 | $n_1$ | 1.491 | $\nu_1$ | 57.8 |
| | $r_2$ | 495.19 | $d_2$ | 8.37 | | | | |
| $L_2$ | $r_3$ | 65.23 | $d_3$ | 13.84 | $n_2$ | 1.517 | $\nu_2$ | 64.1 |
| | $r_4$ | 131.62 | $d_4$ | 12.04 | | | | |
| $L_3$ | $r_5$ | 121.18 | $d_5$ | 3.57 | $n_3$ | 1.805 | $\nu_3$ | 25.4 |
| | $r_6$ | 54.70 | | | | | | |

TABLE 6-continued

Embodiment 6

|  |  |  | $d_6$ | 14.45 |  |  |
|---|---|---|---|---|---|---|
| $L_4$ | $r_7$ | 77.50 | $d_7$ | 23.69 | $n_4$ 1.620 | $\nu_4$ 60.3 |
|  | $r_8$ | −102.00 | $d_8$ | 42.30 |  |  |
| $L_5$ | $r_9^*$ | −39.81 | $d_9$ | 3.48 | $n_5$ 1.491 | $\nu_5$ 57.8 |
|  | $r_{10}$ | ∞ | $d_{10}$ | 7.82 |  |  |
| P | $r_{11}$ | ∞ | $d_{11}$ | 10.30 | $n_6$ 1.536 | $\nu_6$ 50.7 |
|  | $r_{12}$ | ∞ |  |  |  |  |

Aspheric surface coefficients

| | $r_1$ | $r_9$ |
|---|---|---|
| $c_2$ | $-0.39306 \times 10^{-6}$ | $0.60497 \times 10^{-6}$ |
| $c_3$ | $-0.30059 \times 10^{-10}$ | $0.28650 \times 10^{-8}$ |
| $c_4$ | $-0.27883 \times 10^{-13}$ | $-0.25539 \times 10^{-11}$ |
| $c_5$ | 0 | $0.89910 \times 10^{-15}$ |
| $c_6$ | 0 | $0.94519 \times 10^{-19}$ |
| $c_7$ | 0 | $0.31110 \times 10^{-22}$ |
| $c_8$ | 0 | $0.44600 \times 10^{-26}$ |

TABLE 7

Embodiment 7

$f = 100 \quad \beta = -0.0514 \quad F_{NO} = 1.10 \quad 2\omega = 52°$

|  |  | Radius of Curvature | Axial Distance | Refractive Index(ND) | Abbe Number ($\nu d$) |
|---|---|---|---|---|---|
| $L_1$ | $r_1^*$ | 2525.57 | $d_1$ 19.31 | $n_1$ 1.491 | $\nu_1$ 57.8 |
|  | $r_2$ | −186.40 | $d_2$ 12.77 |  |  |
| $L_2$ | $r_3^*$ | 129.79 | $d_3$ 14.90 | $n_2$ 1.491 | $\nu_2$ 57.8 |
|  | $r_4$ | −330.39 | $d_4$ 13.26 |  |  |
| $L_3$ | $r_5$ | 254.13 | $d_5$ 5.10 | $n_3$ 1.805 | $\nu_3$ 25.4 |
|  | $r_6$ | 73.94 | $d_6$ 9.83 |  |  |
| $L_4$ | $r_7$ | 79.13 | $d_7$ 23.16 | $n_4$ 1.620 | $\nu_4$ 60.3 |
|  | $r_8$ | −111.83 | $d_8$ 46.41 |  |  |
| $L_5$ | $r_9^*$ | −39.15 | $d_9$ 3.50 | $n_5$ 1.491 | $\nu_5$ 57.8 |
|  | $r_{10}$ | ∞ | $d_{10}$ 6.70 |  |  |
| P | $r_{11}$ | ∞ | $d_{11}$ 10.38 | $n_6$ 1.536 | $\nu_6$ 50.7 |
|  | $r_{12}$ | ∞ |  |  |  |

Aspheric surface coefficients

| | $r_1$ | $r_3$ | $r_9$ |
|---|---|---|---|
| $c_2$ | $-0.99058 \times 10^{-6}$ | $0.54595 \times 10^{-6}$ | $-0.68342 \times 10^{-6}$ |
| $c_3$ | $0.95723 \times 10^{-10}$ | $-0.16031 \times 10^{-9}$ | $0.30986 \times 10^{-8}$ |
| $c_4$ | $-0.90488 \times 10^{-14}$ | $-0.68415 \times 10^{-14}$ | $-0.21881 \times 10^{-11}$ |
| $c_5$ | 0 | 0 | $0.84873 \times 10^{-15}$ |
| $c_6$ | 0 | 0 | $0.86246 \times 10^{-19}$ |
| $c_7$ | 0 | 0 | $0.28056 \times 10^{-22}$ |
| $c_8$ | 0 | 0 | $0.39689 \times 10^{-26}$ |

TABLE 8

Embodiment 8

$f = 100 \quad \beta = -0.0514 \quad F_{NO} = 1.10 \quad 2\omega = 52°$

|  |  | Radius of Curvature | Axial Distance | Refractive Index(ND) | Abbe Number ($\nu d$) |
|---|---|---|---|---|---|
| $L_1$ | $r_1^*$ | 74.20 | $d_1$ 12.34 | $n_1$ 1.491 | $\nu_1$ 57.8 |
|  | $r_2^*$ | 241.90 | $d_2$ 18.49 |  |  |
| $L_2$ | $r_3$ | 119.24 | $d_3$ 11.41 | $n_2$ 1.620 | $\nu_2$ 60.3 |
|  | $r_4$ | 2150.44 | $d_4$ 10.68 |  |  |
| $L_3$ | $r_5$ | 266.02 | $d_5$ 4.82 | $n_3$ 1.805 | $\nu_3$ 25.4 |
|  | $r_6$ | 60.52 | $d_6$ 9.94 |  |  |
| $L_4$ | $r_7$ | 72.35 | $d_7$ 19.91 | $n_4$ 1.620 | $\nu_4$ 60.3 |
|  | $r_8$ | −103.88 | $d_8$ 43.11 |  |  |
| $L_5$ | $r_9^*$ | −38.22 | $d_9$ 3.43 | $n_5$ 1.491 | $\nu_5$ 57.8 |
|  | $r_{10}$ | ∞ | $d_{10}$ 3.96 |  |  |
| P | $r_{11}$ | ∞ | $d_{11}$ 10.30 | $n_6$ 1.536 | $\nu_6$ 50.7 |
|  | $r_{12}$ | ∞ |  |  |  |

Aspheric surface coefficients

| | $r_1$ | $r_2$ | $r_9$ |
|---|---|---|---|
| $c_2$ | $-0.45029 \times 10^{-7}$ | $0.54954 \times 10^{-6}$ | $0.10789 \times 10^{-5}$ |
| $c_3$ | $0.11543 \times 10^{-9}$ | $0.16749 \times 10^{-9}$ | $0.31363 \times 10^{-8}$ |
| $c_4$ | $0.24821 \times 10^{-13}$ | $0.44094 \times 10^{-13}$ | $-0.25385 \times 10^{-11}$ |
| $c_5$ | 0 | 0 | $0.88236 \times 10^{-15}$ |
| $c_6$ | 0 | 0 | $0.94861 \times 10^{-19}$ |
| $c_7$ | 0 | 0 | $0.31240 \times 10^{-22}$ |
| $c_8$ | 0 | 0 | $0.44883 \times 10^{-26}$ |

TABLE 9

Embodiment 9

$f = 100 \quad \beta = -0.0735 \quad F_{NO} = 1.05 \quad 2\omega = 52°$

|  |  | Radius of Curvature | Axial Distance | Refractive Index(ND) | Abbe Number ($\nu d$) |
|---|---|---|---|---|---|
| $L_1$ | $r_1^*$ | 77.36 | $d_1$ 14.87 | $n_1$ 1.491 | $\nu_1$ 57.8 |
|  | $r_2^*$ | −155.39 | $d_2$ 18.84 |  |  |
| $L_2$ | $r_3$ | 111.03 | $d_3$ 11.03 | $n_2$ 1.620 | $\nu_2$ 60.3 |
|  | $r_4$ | −1133.31 | $d_4$ 10.65 |  |  |
| $L_3$ | $r_5$ | 751.65 | $d_5$ 3.45 | $n_3$ 1.683 | $\nu_3$ 32.1 |
|  | $r_6$ | 63.75 | $d_6$ 11.78 |  |  |
| $L_4$ | $r_7$ | 82.62 | $d_7$ 21.73 | $n_4$ 1.620 | $\nu_4$ 60.3 |
|  | $r_8$ | −97.05 | $d_8$ 48.91 |  |  |
| $L_5$ | $r_9^*$ | −40.39 | $d_9$ 3.45 | $n_5$ 1.491 | $\nu_5$ 57.8 |
|  | $r_{10}$ | ∞ | $d_{10}$ 5.34 |  |  |
| P | $r_{11}$ | ∞ | $d_{11}$ 10.34 | $n_6$ 1.536 | $\nu_6$ 50.7 |
|  | $r_{12}$ | ∞ |  |  |  |

Aspheric surface coefficients

| | $r_1$ | $r_2$ | $r_9$ |
|---|---|---|---|
| $c_2$ | $-0.11002 \times 10^{-6}$ | $0.58585 \times 10^{-6}$ | $0.48710 \times 10^{-6}$ |
| $c_3$ | $0.11505 \times 10^{-9}$ | $0.13774 \times 10^{-9}$ | $0.30672 \times 10^{-8}$ |
| $c_4$ | $-0.10133 \times 10^{-12}$ | $-0.80329 \times 10^{-13}$ | $-0.25403 \times 10^{-11}$ |
| $c_5$ | 0 | 0 | $0.78804 \times 10^{-15}$ |
| $c_6$ | 0 | 0 | $0.86092 \times 10^{-19}$ |
| $c_7$ | 0 | 0 | $0.29169 \times 10^{-22}$ |
| $c_8$ | 0 | 0 | $0.41738 \times 10^{-26}$ |

TABLE 10

Embodiment 10

$f = 100 \quad \beta = -0.0735 \quad F_{NO} = 1.05 \quad 2\omega = 52°$

TABLE 10-continued

Embodiment 10

| | Radius of Curvature | | Axial Distance | Refractive Index(ND) | Abbe Number ($\nu d$) |
|---|---|---|---|---|---|
| $L_1$ | $r_1$* | 72.26 | | | |
| | | | $d_1$ 14.82 | $n_1$ 1.491 | $\nu_1$ 57.8 |
| | $r_2$* | 149.49 | | | |
| | | | $d_2$ 15.08 | | |
| | $r_3$ | 112.53 | | | |
| $L_2$ | | | $d_3$ 10.99 | $n_2$ 1.620 | $\nu_2$ 60.2 |
| | $r_4$ | $-753.53$ | | | |
| | | | $d_4$ 10.58 | | |
| | $r_5$ | 1120.71 | | | |
| $L_3$ | | | $d_5$ 3.43 | $n_3$ 1.673 | $\nu_3$ 32.2 |
| | $r_6$ | 63.99 | | | |
| | | | $d_6$ 11.82 | | |
| | $r_7$ | 83.05 | | | |
| $L_4$ | | | $d_7$ 21.77 | $n_4$ 1.620 | $\nu_4$ 60.3 |
| | $r_8$ | $-96.77$ | | | |
| | | | $d_8$ 48.60 | | |
| | $r_9$* | $-40.44$ | | | |
| $L_5$ | | | $d_9$ 3.43 | $n_5$ 1.491 | $\nu_5$ 57.8 |
| | $r_{10}$ | $\infty$ | | | |
| | | | $d_{10}$ 5.47 | | |
| | $r_{11}$ | $\infty$ | | | |
| P | | | $d_{11}$ 10.30 | $n_6$ 1.536 | $\nu_6$ 50.7 |
| | $r_{12}$ | $\infty$ | | | |

| Aspheric surface coefficients | | | |
|---|---|---|---|
| | $r_1$ | $r_2$ | $r_9$ |
| $c_2$ | $-0.11405 \times 10^{-6}$ | $0.60573 \times 10^{-6}$ | $0.55773 \times 10^{-6}$ |
| $c_3$ | $0.12100 \times 10^{-9}$ | $0.13943 \times 10^{-9}$ | $0.31334 \times 10^{-8}$ |
| $c_4$ | $-0.10955 \times 10^{-12}$ | $-0.87685 \times 10^{-13}$ | $-0.26303 \times 10^{-11}$ |
| $c_5$ | 0 | 0 | $0.81319 \times 10^{-15}$ |
| $c_6$ | 0 | 0 | $0.89559 \times 10^{-19}$ |
| $c_7$ | 0 | 0 | $0.30685 \times 10^{-22}$ |
| $c_8$ | 0 | 0 | $0.44281 \times 10^{-26}$ |

TABLE 11

Embodiment 11

$f = 100 \quad \beta = -0.0514 \quad F_{NO} = 1.05 \quad 2\omega = 52°$

| | Radius of Curvature | | Axial Distance | Refractive Index(ND) | Abbe Number ($\nu d$) |
|---|---|---|---|---|---|
| $L_1$ | $r_1$* | 76.40 | | | |
| | | | $d_1$ 14.87 | $n_1$ 1.491 | $\nu_1$ 57.8 |
| | $r_2$ | $-153.55$ | | | |
| | | | $d_2$ 13.24 | | |
| | $r_3$* | 111.11 | | | |
| $L_2$ | | | $d_3$ 11.72 | $n_2$ 1.491 | $\nu_2$ 57.8 |
| | $r_4$ | $-624.62$ | | | |
| | | | $d_4$ 10.60 | | |
| | $r_5$ | 904.81 | | | |
| $L_3$ | | | $d_5$ 3.44 | $n_3$ 1.592 | $\nu_3$ 30.9 |
| | $r_6$ | 64.25 | | | |
| | | | $d_6$ 11.83 | | |
| | $r_7$ | 82.73 | | | |
| $L_4$ | | | $d_7$ 21.84 | $n_4$ 1.620 | $\nu_4$ 60.3 |
| | $r_8$ | $-98.88$ | | | |
| | | | $d_8$ 48.68 | | |
| | $r_9$* | $-40.67$ | | | |
| $L_5$ | | | $d_9$ 3.45 | $n_5$ 1.491 | $\nu_5$ 57.8 |
| | $r_{10}$ | $\infty$ | | | |
| | | | $d_{10}$ 3.97 | | |
| | $r_{11}$ | $\infty$ | | | |
| P | | | $d_{11}$ 10.34 | $n_6$ 1.536 | $\nu_6$ 50.7 |
| | $r_{12}$ | $\infty$ | | | |

| Aspheric surface coefficients | | | |
|---|---|---|---|
| | $r_1$ | $r_3$ | $r_9$ |
| $c_2$ | $-0.18304 \times 10^{-7}$ | $0.71434 \times 10^{-6}$ | $0.35926 \times 10^{-6}$ |
| $c_3$ | $0.18313 \times 10^{-9}$ | $0.23211 \times 10^{-9}$ | $0.30957 \times 10^{-8}$ |
| $c_4$ | $-0.99077 \times 10^{-13}$ | $-0.79948 \times 10^{-13}$ | $-0.25670 \times 10^{-11}$ |
| $c_5$ | 0 | 0 | $0.78909 \times 10^{-15}$ |
| $c_6$ | 0 | 0 | $0.86315 \times 10^{-19}$ |
| $c_7$ | 0 | 0 | $0.29372 \times 10^{-22}$ |
| $c_8$ | 0 | 0 | $0.42101 \times 10^{-26}$ |

Figures 2A, 2B:
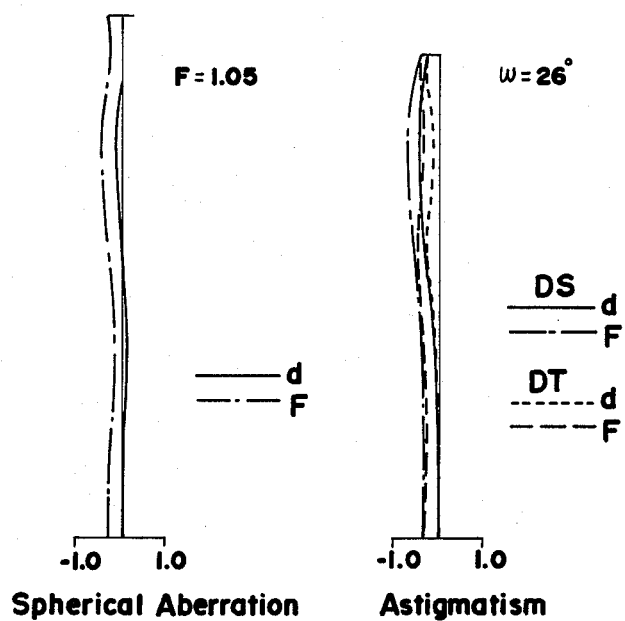
FIGS. 2a and 2b represent graphic plots of aberration curves of the first embodiment of the present invention.
Figure 4A:
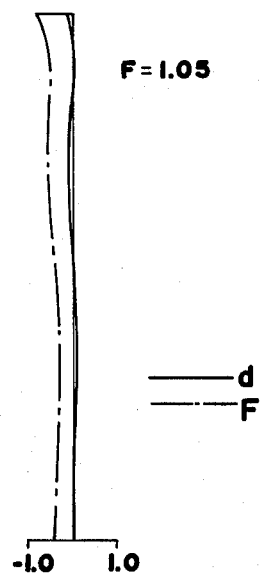
FIGS. 4a and 4b represent graphic plots of aberration curves of the second embodiment of the present invention.
Figure 4B:
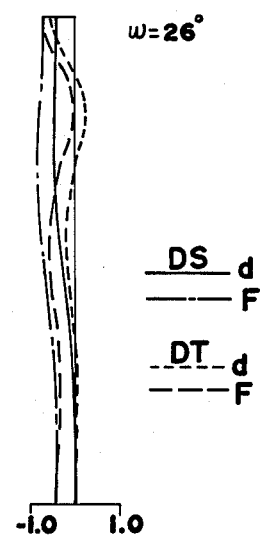
Figure 6A:
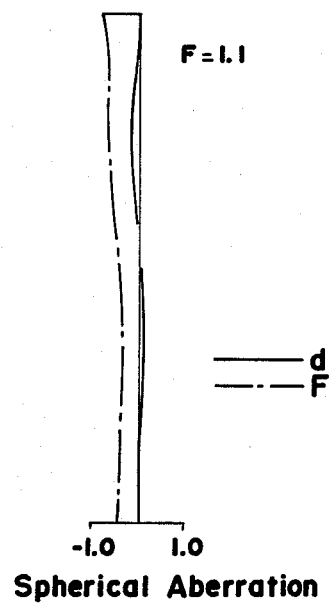
FIGS. 6a and 6b represent graphic plots of aberration curves of the third embodiment of the present invention.
Figure 6B:
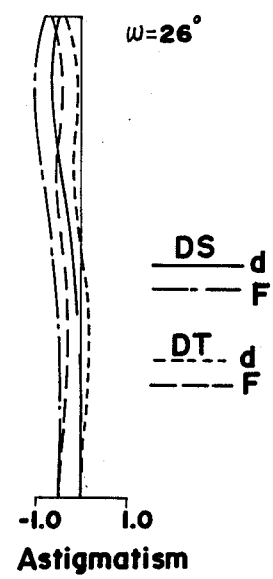
Figure 8A:
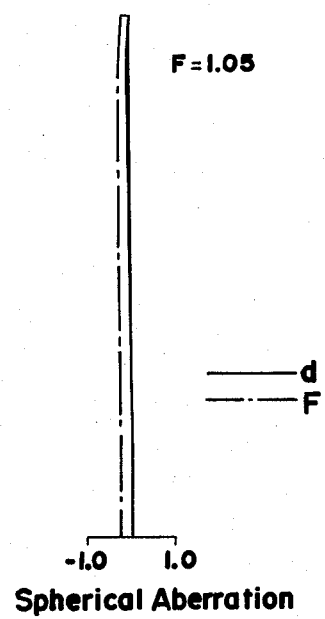
FIGS. 8a and 8b represent graphic plot of aberration curves of the fourth embodiment of the present invention.
Figure 8B:
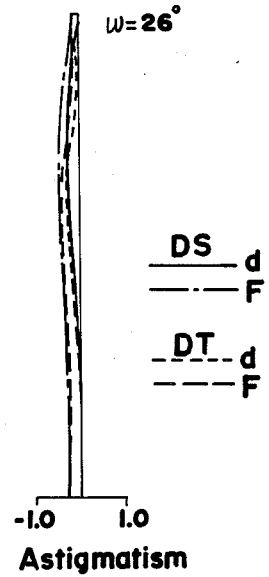
Figure 10A:
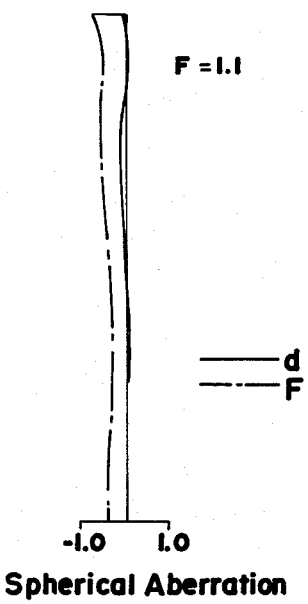
FIGS. 10a and 10b represent graphic plots of aberration curves of the fifth embodiment of the present invention.
Figure 10B:
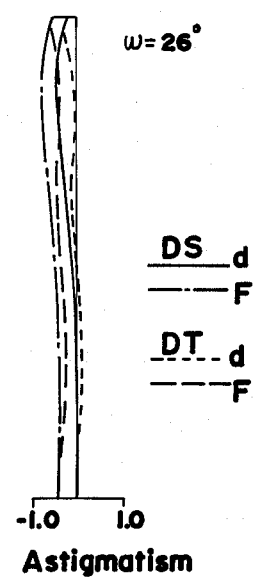
Figure 12A:
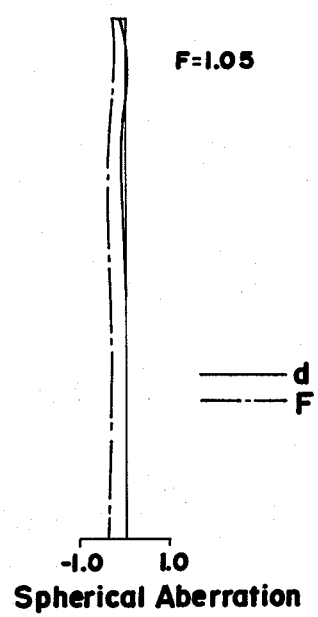
FIGS. 12a and 12b represent graphic plots of aberration curves of the sixth embodiment of the present invention.
Figure 12B:
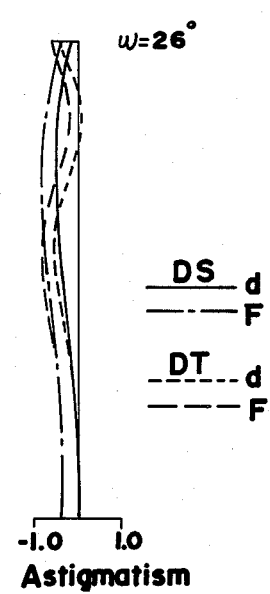
Figure 14A:
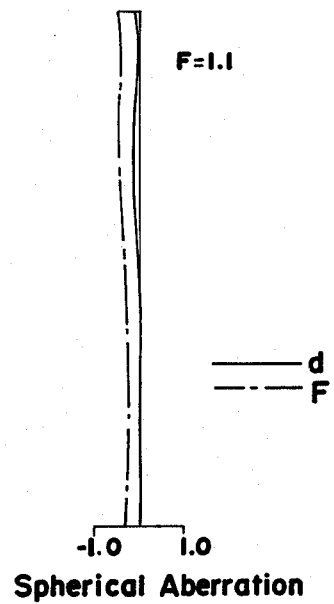
FIGS. 14a and 14b represent graphic plots of aberration curves of the seventh embodiment of the present invention.
Figure 14B:
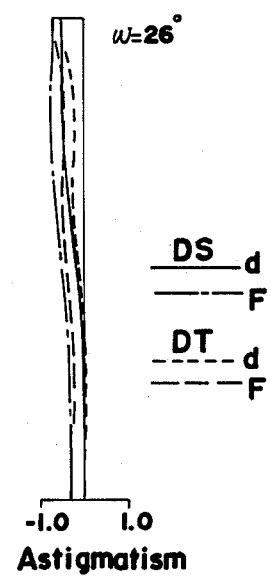
Figure 20A:
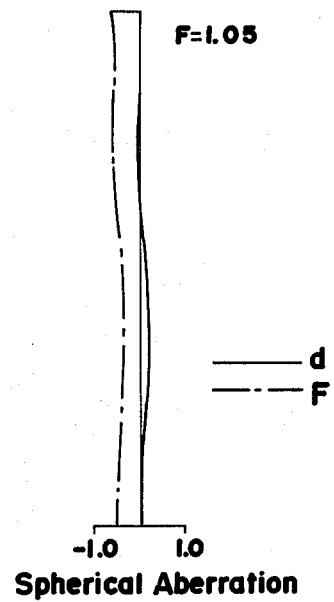
FIGS. 20a and 20b represent graphic plots of aberration curves of the tenth embodiment of the present invention.
Figure 20B:
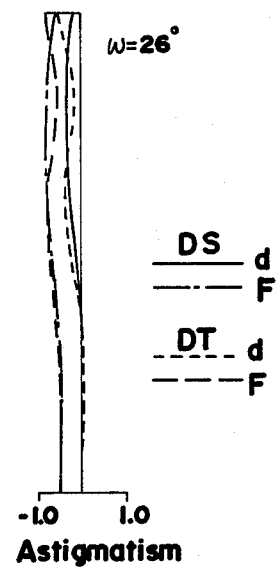
Figure 22A:
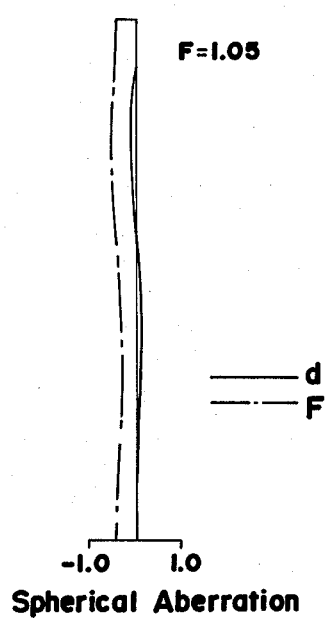
FIGS. 22a and 22b represent graphic plots of aberration curves of the eleventh embodiment of the present invention.
Figure 22B:
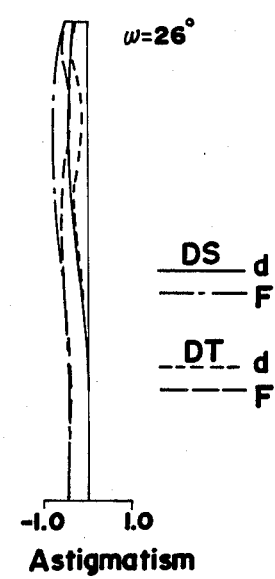

In these Figures and the above Tables, P represents the face plate of a cathode ray tube, and $r_{12}$ represents the fluorescent surface thereof. FIGS. 2,4,6,8,10,12,14,16,18,20 and 22 represent the aberration curves of the first through eleventh embodiments, respectively. As in the embodiments, the fourth lens unit ($L_4$) is recommended to be a bi-concave lens.

Embodiment 4 is an example of optical coupling, wherein the air space between the fifth lens unit ($L_5$) and the face plate (P) is filled with an optical medium.

Although the face plate(P) and the above mentioned optical medium are made of only one material in each embodiment, each of them can be composed of some layers and the optical performance is affected minimally with the adjustment of thickness, depending on the refractive indices.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A lens system for projecting onto a screen a video image formed on a face plate of a cathode ray tube comprising, from the screen side to the tube side:
   a first positive lens unit;
   a second positive lens unit;
   a third negative lens unit having a screen side surface convex to the screen side;
   a fourth lens unit of bi-convex lens; and
   a fifth negative lens unit having a screen side surface concave to the screen side, at least the fourth lens unit being made of glass material, wherein the lens system includes at least one aspheric surface and fulfills the following conditions:

$2 < f_1/f < 5$ $1 < f_2/|f_3| < 3$ $\nu_3 < 40$ wherein;

f represents the focal length of the whole lens system;
$f_1$ represents the focal length of the first positive lens unit;
$f_2$ represents the focal length of the second positive lens unit;
$f_3$ represents the focal length of the third negative lens unit; and
$\nu_3$ represents the Abbe number of the third negative lens unit.

2. The invention of claim 1, wherein the video projector lens system further fulfills the following condition:

$n_4 > 1.55$ wherein;

$n_4$ represents the refractive index of the fourth lens unit.

3. The invention of claim 1, wherein the video projector lens system further fulfills the following condition:

$$0.6 < f_4/f < 0.9$$

wherein;

$f_4$ represents the focal length of the fourth lens unit.

4. The invention of claim 1, wherein the video projector lens system further fulfills the following conditions:

$$0.1f < D_{12} + D_{23} < 0.4f$$

$$0.35f < D_{45} < 0.5f$$

wherein;

$D_{12}$ represents the air space between the first lens unit and the second lens unit;

$D_{23}$ represents the air space between the second lens unit and the third lens unit; and $D_{45}$ represents the air space between the fourth lens unit and the fifth lens unit.

5. The invention of claim 1, wherein the first positive lens unit has a screen side surface aspheric.

6. A lens system for projecting onto a screen a video image formed on a face plate of a cathode ray tube comprising, from the screen side to the tube side:

a first positive lens unit;

a second positive lens unit;

a third negative lens unit having a screen side surface convex to the screen side;

a fourth lens unit of bi-convex lens; and a fifth negative lens unit having a screen side surface concave to the screen side, at least the fourth lens unit being made of glass material, wherein the lens system includes at least one aspheric surface and fulfills the following conditions:

$$0.6 < f_4/f < 0.9$$

$$n_4 > 1.55$$

7. The invention of claim 5, wherein the fifth negative lens unit has a screen side surface aspheric.

8. The invention of claim 5, wherein the first positive lens unit has a tube side surface aspheric.

9. A lens system for projecting onto a screen a video image formed on a plate of a cathode ray tube wherein L represents the lens element and P represents the face plate of a cathode ray tube comprising the following design parameters, wherein asterisk(*) represents the aspheric surface with the following aspheric coefficients $C_i$:

| | | $f = 100$ $\beta = -0.0735$ $F_{NO} = 1.05$ $2\omega = 52°$ | | | |
|---|---|---|---|---|---|
| | | Radius of Curvature | Axial Distance | Refractive Index(ND) | Abbe Number ($\nu d$) |
| $L_1$ | $r_1$* | 108.49 | | | |
| | | | $d_1$ 15.17 | $n_1$ 1.491 | $\nu_1$ 57.8 |
| | $r_2$* | 243.30 | | | |
| | | | $d_2$ 16.15 | | |
| $L_2$ | $r_3$ | 80.26 | | | |
| | | | $d_3$ 12.40 | $n_2$ 1.620 | $\nu_2$ 60.3 |
| | $r_4$ | 288.70 | | | |
| | | | $d_4$ 8.60 | | |
| $L_3$ | $r_5$ | 219.49 | | | |
| | | | $d_5$ 3.44 | $n_3$ 1.805 | $\nu_3$ 25.4 |
| | $r_6$ | 68.73 | | | |
| | | | $d_6$ 10.00 | | |
| $L_4$ | $r_7$ | 83.89 | | | |
| | | | $d_7$ 21.36 | $n_4$ 1.620 | $\nu_4$ 60.3 |
| | $r_8$ | −104.29 | | | |
| | | | $d_8$ 49.32 | | |
| $L_5$ | $r_9$* | −40.82 | | | |
| | | | $d_9$ 3.44 | $n_5$ 1.491 | $\nu_5$ 57.8 |
| | $r_{10}$ | ∞ | | | |
| | | | $d_{10}$ 6.64 | $n_5$ 1.410 | $\nu_6$ 51.5 |
| | $r_{11}$ | ∞ | | | |
| P | | | $d_{11}$ 10.33 | $n_7$ 1.536 | $\nu_7$ 50.7 |
| | $r_{12}$ | ∞ | | | |

| Aspheric surface coefficients | | | |
|---|---|---|---|
| | $r_1$ | $r_3$ | $r_9$ |
| $c_2$ | $-0.71709 \times 10^{-7}$ | $0.40397 \times 10^{-6}$ | $-0.14829 \times 10^{-5}$ |
| $c_3$ | $-0.79147 \times 10^{-11}$ | $0.14996 \times 10^{-9}$ | $0.31587 \times 10^{-8}$ |
| $c_4$ | $0.10125 \times 10^{-12}$ | $0.81032 \times 10^{-13}$ | $-0.19930 \times 10^{-11}$ |
| $c_5$ | $-0.21442 \times 10^{-16}$ | 0 | $0.63341 \times 10^{-15}$ |
| $c_6$ | 0 | 0 | $0.61376 \times 10^{-19}$ |
| $c_7$ | 0 | 0 | $0.27615 \times 10^{-22}$ |
| $c_8$ | 0 | 0 | $0.42441 \times 10^{-26}$ |

* * * * *